US 6,654,496 B1

(12) United States Patent
Goldberg

(10) Patent No.: US 6,654,496 B1
(45) Date of Patent: Nov. 25, 2003

(54) METHOD AND APPARATUS FOR SELECTING SYMBOLS USING STROKES ON A USER INTERFACE

(75) Inventor: David Goldberg, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/347,461

(22) Filed: Jul. 6, 1999

(51) Int. Cl.[7] .................................................. G06K 9/00
(52) U.S. Cl. ........................ 382/187; 382/188; 382/202; 345/156
(58) Field of Search ......................... 382/181, 185–189, 382/202, 312–314, 315; 345/156, 173, 180, 182, 179, 195, 810; 358/424

(56) References Cited

U.S. PATENT DOCUMENTS

| | | | | |
|---|---|---|---|---|
| 4,561,105 A | * | 12/1985 | Crane et al. ............... | 382/185 |
| 4,926,010 A | | 5/1990 | Citron ........................ | 178/18 |
| 5,049,862 A | * | 9/1991 | Dao et al. .................. | 345/179 |
| 5,194,852 A | * | 3/1993 | More et al. ................ | 345/182 |
| 5,313,527 A | * | 5/1994 | Guberman et al. ......... | 382/186 |
| 5,500,937 A | * | 3/1996 | Thompson-Rohrlich .... | 345/764 |
| 5,555,157 A | * | 9/1996 | Moller et al. .............. | 361/683 |
| 5,596,656 A | | 1/1997 | Goldberg .................... | 382/186 |
| 5,838,302 A | | 11/1998 | Kuriyama et al. .......... | 345/173 |
| 6,008,799 A | * | 12/1999 | Van Kleeck ................ | 345/173 |
| 6,064,766 A | * | 5/2000 | Sklarew ..................... | 382/189 |
| 6,326,957 B1 | * | 12/2001 | Nathan et al. .............. | 345/179 |

FOREIGN PATENT DOCUMENTS

| | | |
|---|---|---|
| EP | 0 603 669 A1 | 6/1994 |
| EP | 0 660 218 A1 | 6/1995 |
| EP | 0 661 619 A1 | 7/1995 |

OTHER PUBLICATIONS

Goldberg et al., "Touch–Typing with a Stylus," Xerox.
Montgomery, "Bringing Manual Input into the 20th Century," IEEE, 11–18 (1982).
Perlin, "Quikwriting: Continuous Stylus–based Text Entry".
Masui, "Integrating Pen Operations for Composition by Example," Sony Computer Science Laboratories, Inc., pps. 211–212 (Japan).

* cited by examiner

Primary Examiner—Mark Wallerson
(74) Attorney, Agent, or Firm—Finnegan, Henderson, Farabow, Garrett & Dunner L.L.P.

(57) ABSTRACT

A method, apparatus, and system are provided for selecting a symbol using a user interface having at least one selectable button adjacent a surface actuated when contacted by a pointing device. Initially, the method and system receives stroke information based on a stroke on the surface adjacent at least one selectable button on the user interface, identifies a symbol based on the stroke information, provides the symbol for further processing.

23 Claims, 8 Drawing Sheets

METHOD AND APPARATUS FOR SELECTING SYMBOLS USING STROKES ON A USER INTERFACE

BACKGROUND OF THE INVENTION

1. Field of the Invention

This invention generally relates to user interfaces for computer based systems and more particularly, to a method and apparatus for selecting symbols using strokes on a user interface.

2. Description of the Related Art

The keyboard continues to be the primary input device for a computer system. It remains relatively unchanged since its original use with typewriters and other early data entry input devices. The keyboard includes a set of keys a user operates with their hands. Generally, the user depresses one or more keys on the keyboard to input a particular symbol to the computer system. The keys are arranged in a standard configuration that users often memorize so that symbols can be entered quickly.

Despite the rapid advances in computer technology, improvements in the keyboard and other input devices have been nominal. For example, few advances have been made to reduce the size of the keyboard. As such, it remains one of the largest and heaviest components in the computer systems. The numerous mechanical moving parts in the keyboard also make the device much more likely to fail and need repair. For at least these reasons, there remains numerous ways to improve the keyboard and other input devices used with computers and computer-based systems.

Several new methods of inputting data have been developed in an effort to make computers smaller, more lightweight, and portable. For example, a pen based interface disclosed in U.S. Pat. No. 5,596,656 by Goldberg titled "Unistrokes for Computerized Interpretation of Handwriting", describes a set of free-form strokes made with a pen on a tablet corresponding to the symbols of a conventional keyboard. In this patent, a computer device recognizes the strokes and translates them to corresponding symbols. Although this method eliminates using buttons and the keyboard, the user must learn numerous free-form strokes to enter the data. Unfortunately, this learning curve may dissuade many users from entering data using this method.

It would be desirable to have a user interface that eliminates the conventional keyboard and provide the advantages of a stroke-based input system that a user is comfortable using.

SUMMARY OF THE INVENTION

In accordance with methods and apparatus consistent with the present invention, as embodied and broadly described herein a method for entering symbols into a user interface is provided. The method and system provides a surface actuated when contacted with a pointing device and positioned in relationship to at least one selectable button, receives stroke information in response to a stroke made by a pointing device on the surface of the user interface and in relationship to at least one selectable button on the user interface, identifies a symbol based on the stroke information and, provides the symbol for further processing.

BRIEF DESCRIPTION OF THE DRAWINGS

The accompanying drawings, which are incorporated in and constitute a part of this specification, illustrate an implementation of the invention and, together with the description, serve to explain the principles of the invention.

In the drawings.

DETAILED DESCRIPTION

Reference will now be made in detail to an implementation of the present invention as illustrated in the accompanying drawings. The same reference numbers will be used throughout the drawings in the following description to refer to the same or like parts.

Methods and systems designed in accordance of the present invention generate a symbol in response to a stroke on a user interface. Each stroke represents a different symbol corresponding to the location and direction of the stroke relative to a button on user interface 200. To enter a symbol, a stroke is made on an area adjacent to an existing button. Because strokes are used in addition to enter the symbols, fewer buttons are required as compared to a conventional keyboard. Furthermore the configuration allows user interface 200 to be made smaller and at a lower cost.

COMPUTER SYSTEM

Figure 1:
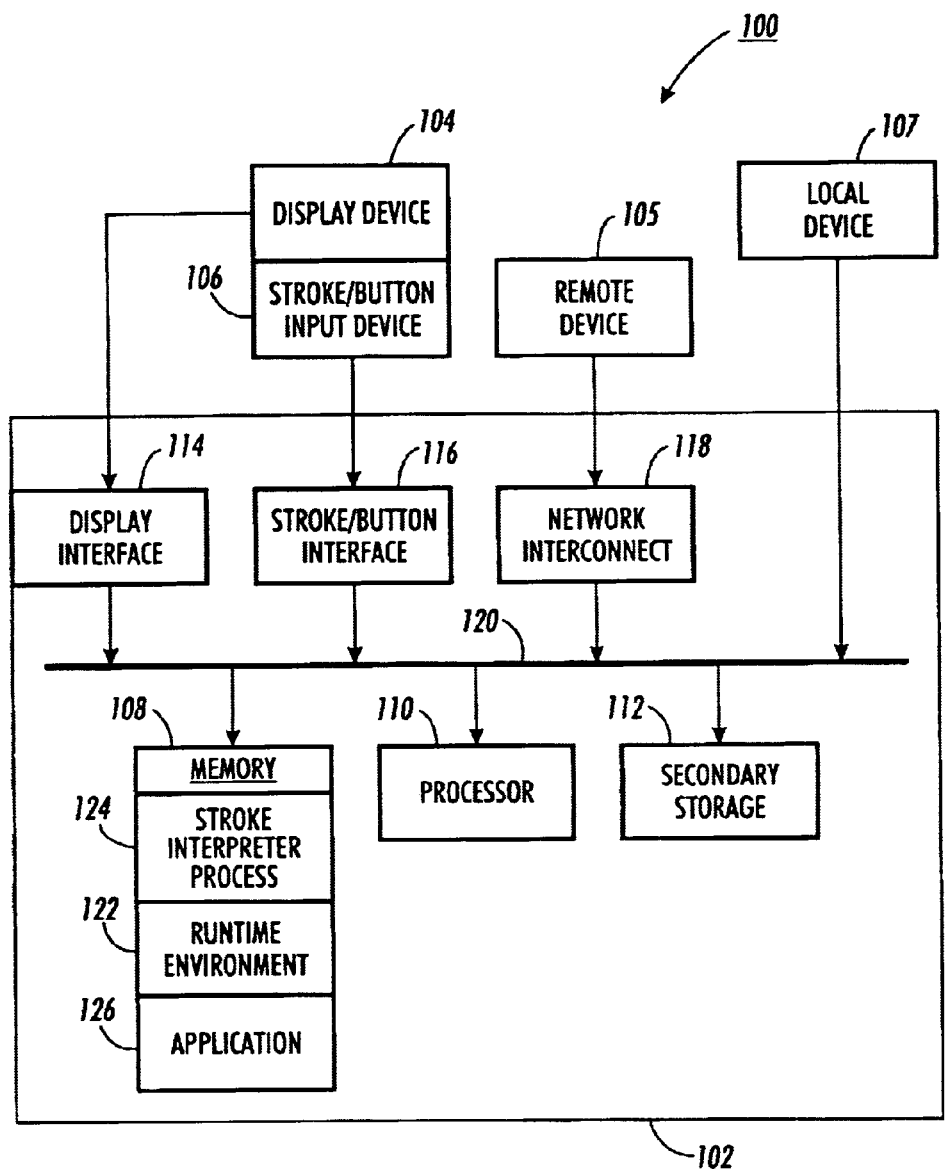
FIG. 1 is a block diagram of a computer system used in accordance with one embodiment of the present invention.

FIG. 1 is a block diagram of a computer system 100 used in accordance with one embodiment of the present invention. Computer system 100 could be any type of system requiring user input, such as a calculator, a desktop computer system, or even a control system used in a larger device such as an automobile or household appliance. Included with computer system 100 is a processor subsystem 102, a display device 104, a stroke/button input device 106, a remote device 105, and a local device 107.

Processor subsystem 102 includes hardware and software used to process input data from stroke/button input device 106. Data can be entered into computer system 100 by entering strokes with a pointing device and actuating buttons on stroke/button input device 106. Processor subsystem 102 processes the input data, and displays the symbols corresponding to the input data on display device 104. Processor subsystem 102 can also transmit data corresponding to these symbols to remote device 105 over a network, and to local device 107. Applications executing on remote device 105 and local device 107 can interpret the data and respond accordingly.

Processor subsystem 102 includes a memory 108 for storing software modules, a processor 110, a secondary storage 112, a display interface 114 coupled to display device 104, a stroke/button interface 116 coupled to stroke/button input device 106, and a network interconnect 118 for connecting computer system 100 to a network such as the Internet. Alternatively, computer system 100 can also operate as a standalone device without accessing information and data on a network. A bus 120 connected to each component in processor subsystem 102 facilitates communication among the components.

Memory 108 includes software modules used to process data received from stroke/button input device 106 via stroke/button interface 116. These software modules may, for example, include a runtime environment 122, a stroke interpreter process 124, and an application 126.

Runtime environment 122 controls execution of stroke interpreter process 124 and other software modules (not shown) in memory 108 or processor 110 and allocates resources in computer system 100. If real-time response is required, runtime environment 122 can be a real-time operation system (RTOS) or small monitor program. Alternatively, runtime environment 122 can be a non-real time operating system such as UNIX or Windows by Microsoft Corporation of Redmond, Wash.

Stroke interpreter process 124 converts input data received from stroke/button input device 106 into a data format useful on a remote device 105 or a local device 107. Strokes made with a pointing device on stroke/button input device 106 generate a starting coordinate, intermediary coordinates, and an ending coordinates. These coordinates are converted by stroke interpreter process 124 into a symbol from a character set, such as ASCII, for further processing. Stroke interpreter process 124 can also process data generated when a user actuates buttons on stroke/button input device 106.

Applications capable of executing on remote device 105, local device 107, or in memory 108 operate on data generated by stroke interpreter process 124. For example, an application may operate as miniature standalone calculator. Strokes entered on stroke/button input device 106 are used to enter numbers into the application and buttons can be used to select mathematical operations to be performed on the numbers. In this example, stroke interpreter process 124 converts the data defining the buttons and strokes received from strokes/button input device 106 into corresponding symbols representing mathematical operations and numbers that an application executing on remote device 105, local device 107, or in memory 108 such as application 126 processes. In an alternative implementation, applications can be designed, for example, as control systems for larger devices than a calculator such as a printer, an appliance, or a large industrial process. These larger devices can be controlled using a combination of strokes and button actuations from stroke/button input device 106 in a similar manner to that discussed above.

Processor 110 can be a general purpose processor which executes different software modules such as the modules stored in memory 108. Alternatively, processor 110 can be an application specific integrated circuit (ASIC) designed specifically to perform processes corresponding to the modules stored in memory 108, such as stroke interpreter process 124.

Secondary storage 112 can be a storage device such as a hard drive or removable floppy disk to store, for example, data and programs used by with computer system 100. Display interface 114 generates symbols corresponding to strokes and buttons entered on stroke/button input device 106 and displays them on display device 104. Stroke/button interface 116 receives signals from stroke/button input device 106 and converts them to a suitable format for transmission over bus 120 and further processing by stroke interpreter process 124. Network interconnect 118 may be a modem, cable modem, or other device that provides connectivity between a network such as the Internet and computer system 100.

Figure 2:
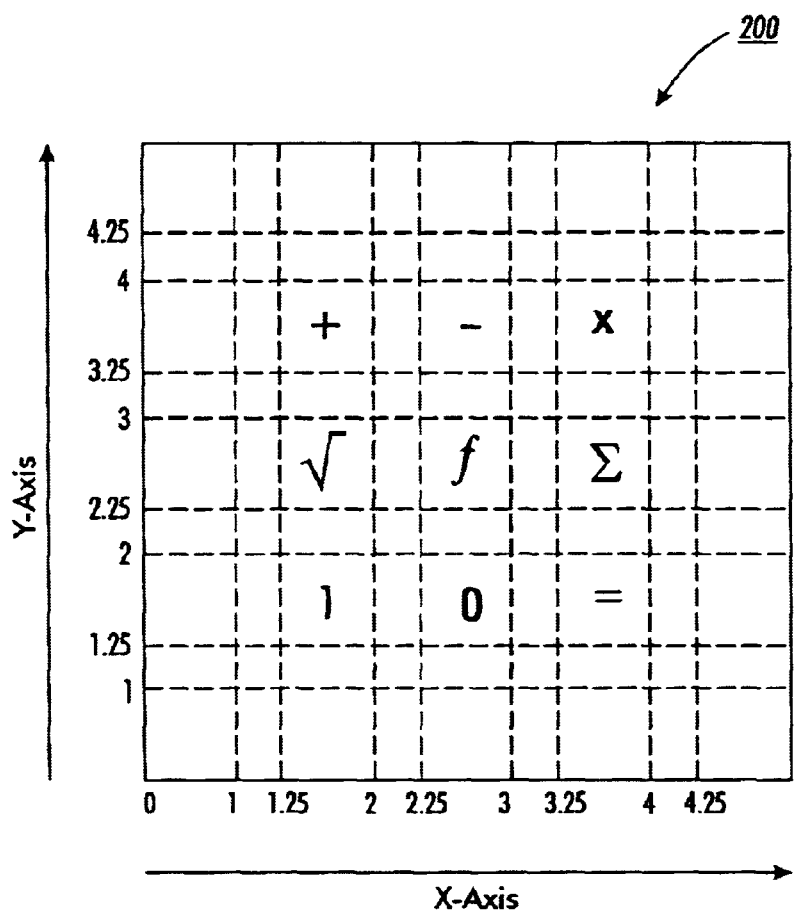
FIG. 2 depicts a user interface with a stroke/button input device designed in accordance with one embodiment of the present invention.

FIG. 2 depicts one embodiment of a user interface 200 for stroke/button input device 106. User interface 200 allows a user to enter data by pressing buttons and stroking the surface of user interface 200. In this example, the buttons represent the mathematical symbols "+,−,×,√,∫,Σ,°, /,=." The buttons can be implemented, for example, as mechanical buttons protruding from the surface or flush buttons fabricated from solid-state materials sensitive to pressure, heat, or changes in electromagnetic fields. Strokes are made in the areas between the buttons, shown in FIG. 2 by broken lines, thus reducing the amount of area required to implement stroke/button input device 106. The areas between the buttons can also be implemented using any material or components capable of detecting strokes, such as material sensitive to pressure, heat, or changes in electro-mechanical fields. These areas can be actuated with a pointing device such as a pen or a person's finger.

In an alternate implementation, strokes can be made across the buttons rather than in a channel area between the buttons as illustrated in FIG. 2. By eliminating the need for a channel between the buttons, even smaller interfaces consistent with the present invention could be designed. This implementation, however, would require additional processing to distinguish between strokes made across several buttons and user's actuating specific buttons. For example, a user could switch modes on user interface 200 to receive either strokes or receive button selections. Alternatively, user interface 200 could be calibrated to measure the typical time period it takes a user to enter a stroke across several buttons versus the time period used by the user to actuate a button. Further, user interface 200 can also be calibrated to determine when a stroke is confined to the area of a single button or spans several buttons. In the former condition, a stroke contained within the area of a single button is interpreted as a button selection while in the latter condition, a stroke that spans several buttons is interpreted in accordance with stroke interpreter process 124. That is, the length of the stroke relative to the width of the buttons helps determine whether to select a button or generate a symbol consistent with the present invention.

Each stroke with the pointing device corresponds to a different symbol depending on the location and direction of the stroke. As a stroke is made on user interface 200, a series of X and Y coordinate pairs are generated by stroke/button input device 106. Each coordinate pair corresponds to predetermined numeric coordinates associated with the X-axis and Y-axis grid illustrated in FIG. 2. For example, the X-axis values on stroke/button input device 106 may range from 0 to 4.25 units and the Y-axis values may also range from 0 to 4.25 units. The location and direction of the stroke is derived from the sequence in the series of coordinates.

Figure 3:
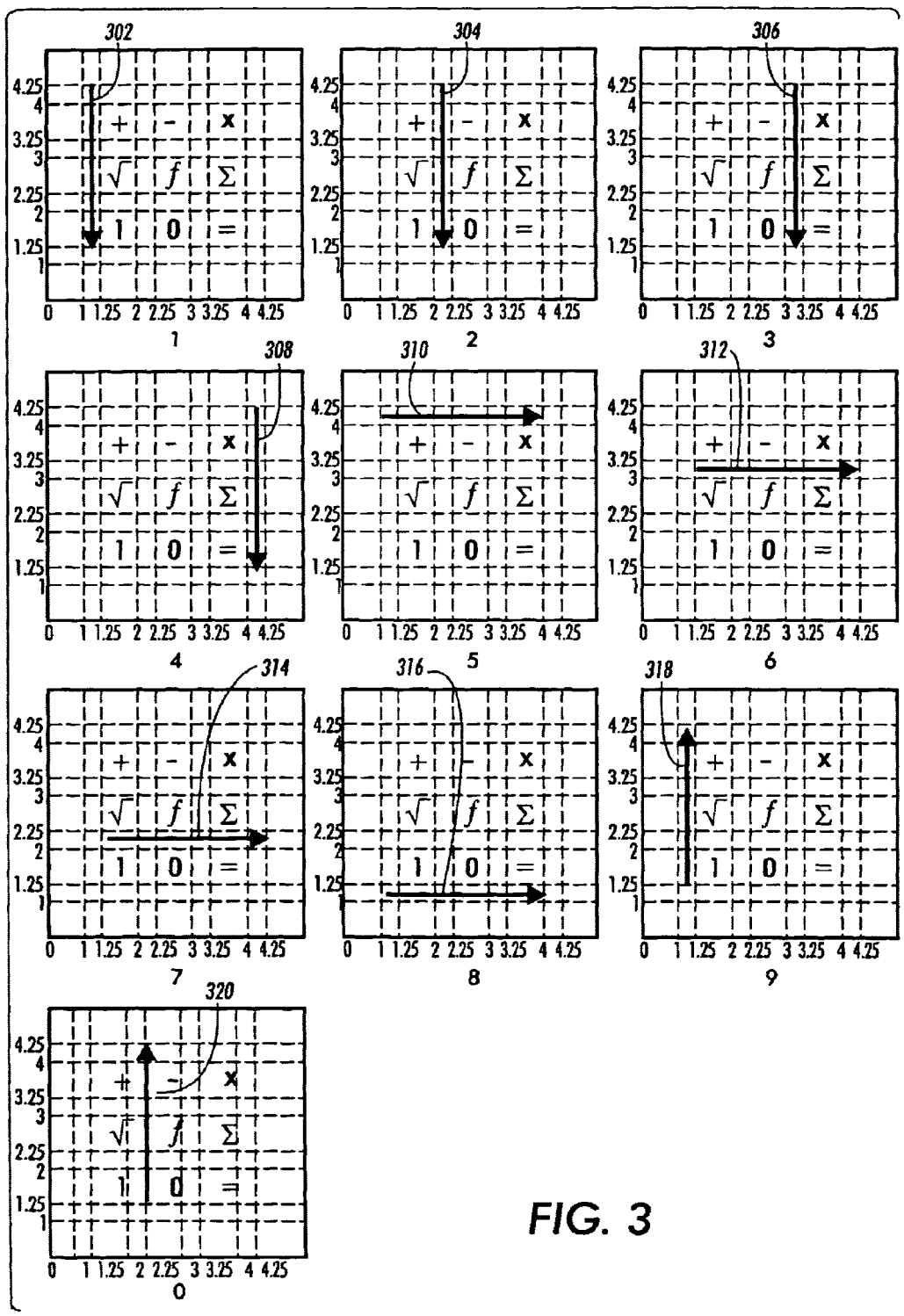
FIG. 3 depicts one embodiment of the present invention for representing the numbers 0–9 using a stroke/button input device having 9 buttons.

Many symbols can be represented by respective combination's of stroke location and direction. FIG. 3 illustrates strokes on user interface 200 an embodiment of the different for representing the numbers 0–9 using an embodiment of stroke/button input device 106 having 9 buttons. Each stroke has a particular location and direction as illustrated by each arrow in FIG. 3. For example, stroke 302 represents the number "1", stroke 304 represents the number "2", stroke 306 represents the number "3", stroke 308 represents the number "4", stroke 310 represents the number "5", stroke 312 represents the number "6", stroke 314 represents the number "7", stroke 316 represents the number "8", stroke 318 represents the number "9", and stroke 320 represents the number "0."

Although the strokes depicted in FIG. 3 appear to be straight, fixed in length, and oriented horizontally or vertically, alternate implementations may use curved and linear strokes of variable lengths and having a wide range of orientations on the input device 106. For example, certain input strokes could be developed that encircle a particular button or operate on a diagonal portion between several buttons. Other more complex strokes are also contemplated that combine linear motions, diagonal motions, and curved strokes. For example, a stroke may include a vertical movement across the screen combined with a horizontal movement across the screen.

Figure 4:
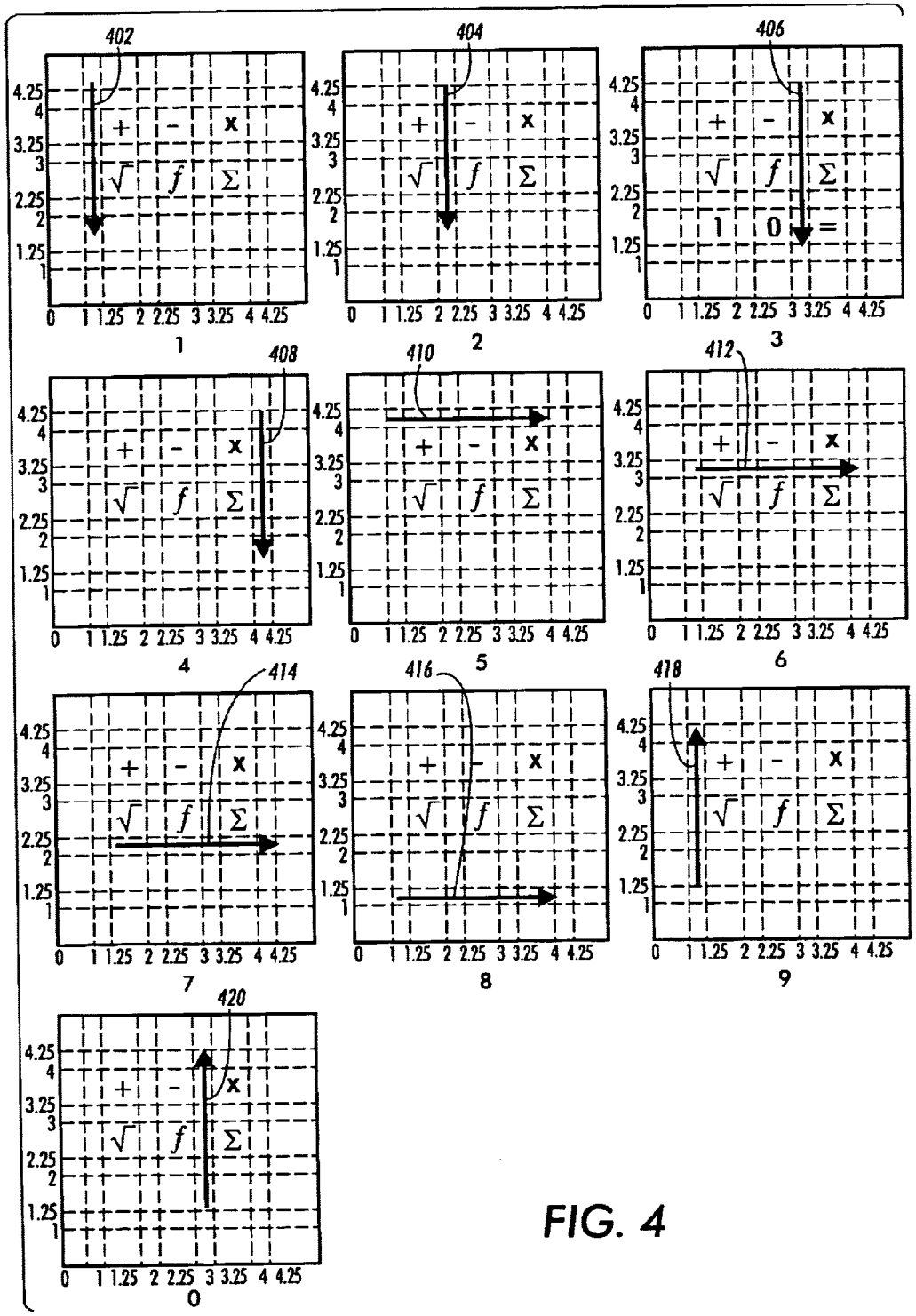
FIG. 4 depicts another embodiment of the present invention for representing numbers 0–9 using a stroke/button input device having 6 buttons.

FIG. 4 illustrates representing numbers 0–9 using an embodiment of stroke/button input device 106 having only 6 buttons. The six buttons represent the mathematical symbols +, −, ×, /, ·, and =. In this embodiment, stroke 402 represent to the number "1", stroke 404 represents the number "2", stroke 406 represents the number "3", stroke 408 represents the number "4", stroke 410 represents the number "5", stroke 412 represents the number "6", stroke 414 represents the number "7", stroke 416 represents the number "8", stroke 418 represents the number "9", and 420 represents the number "0".

Figure 5:
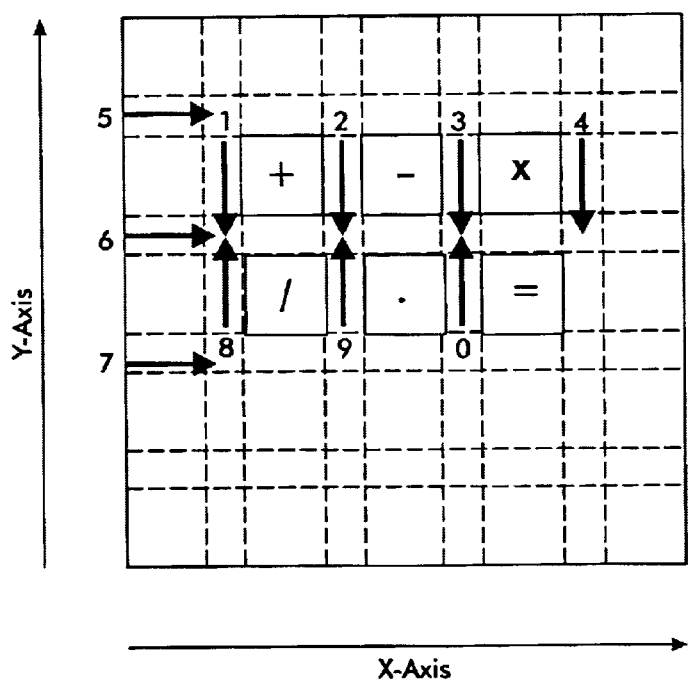
FIG. 5 depicts yet another embodiment of the present invention for representing numbers 0–9 using stroke/button input device.

Yet another series of strokes for representing numbers 0–9 using a 6-button stroke/button input device 106 is depicted in FIG. 5. In this example, a stroke the width of a button on user interface 200 is used to generate a symbol. If user interface 200 is large enough, the arrows and associated symbols such as the numbers can be indicated directly on the surface of stroke/button input device 106, as shown in FIG. 5.

STROKE-BASED INPUT PROCESS

Figure 6:
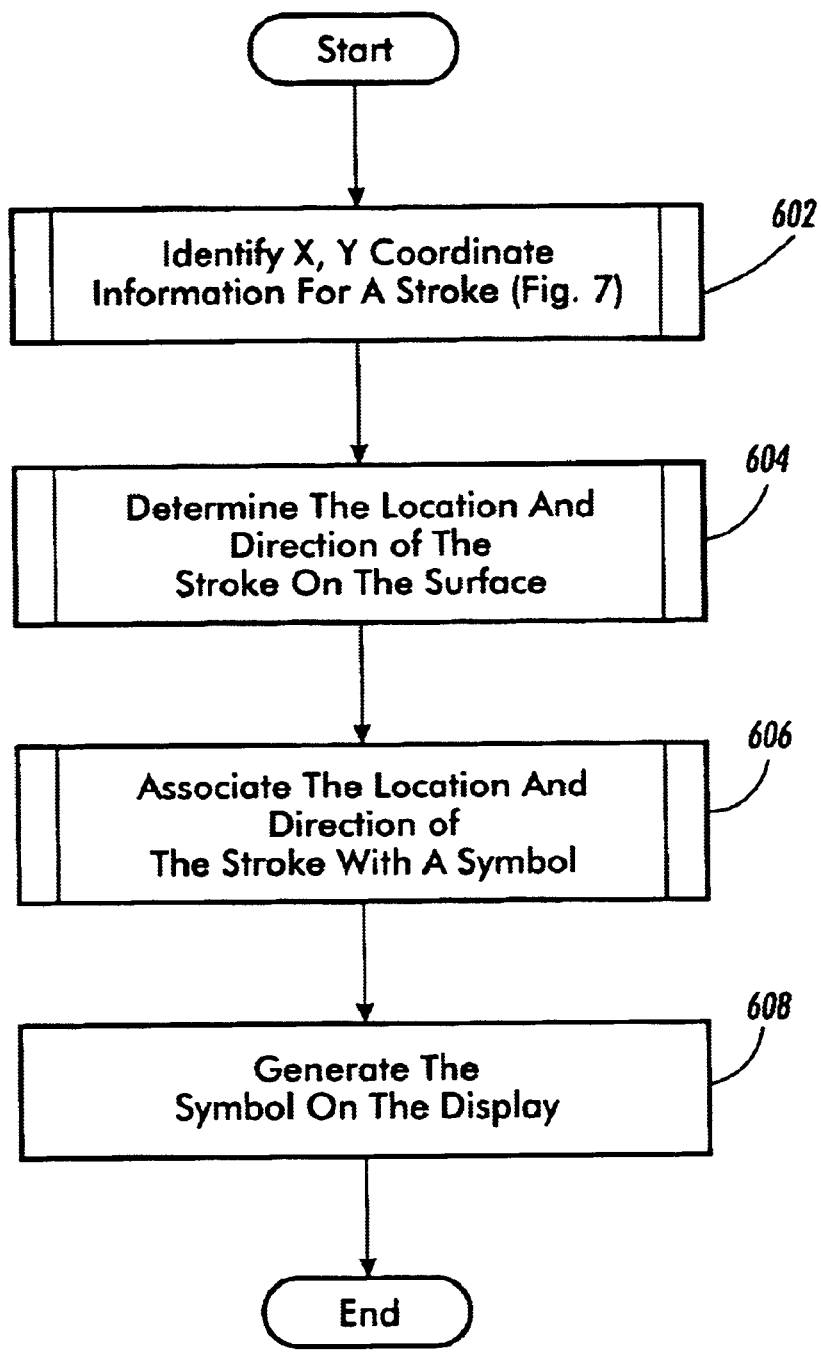
FIG. 6 is a flowchart illustrating the steps associated with processing strokes made on a stroke/button input device consistent with the invention.

FIG. 6 is a flow chart showing the steps performed by processor 110 in executing stroke interpreter process 124 for processing strokes made on stroke/button input-device 106. In response to a user stroking user interface 200 with a pointing implement, stroke/button input device 106 converts the stroke into X, Y coordinate information defining the stroke, and forwards the information to processor 110. Initially, processor 110 receives the X, Y coordinate information for the stroke (step 602). Next, processor 110 determines the location and direction of the stroke based on the X, Y coordinate information (step 604).

Figure 7:
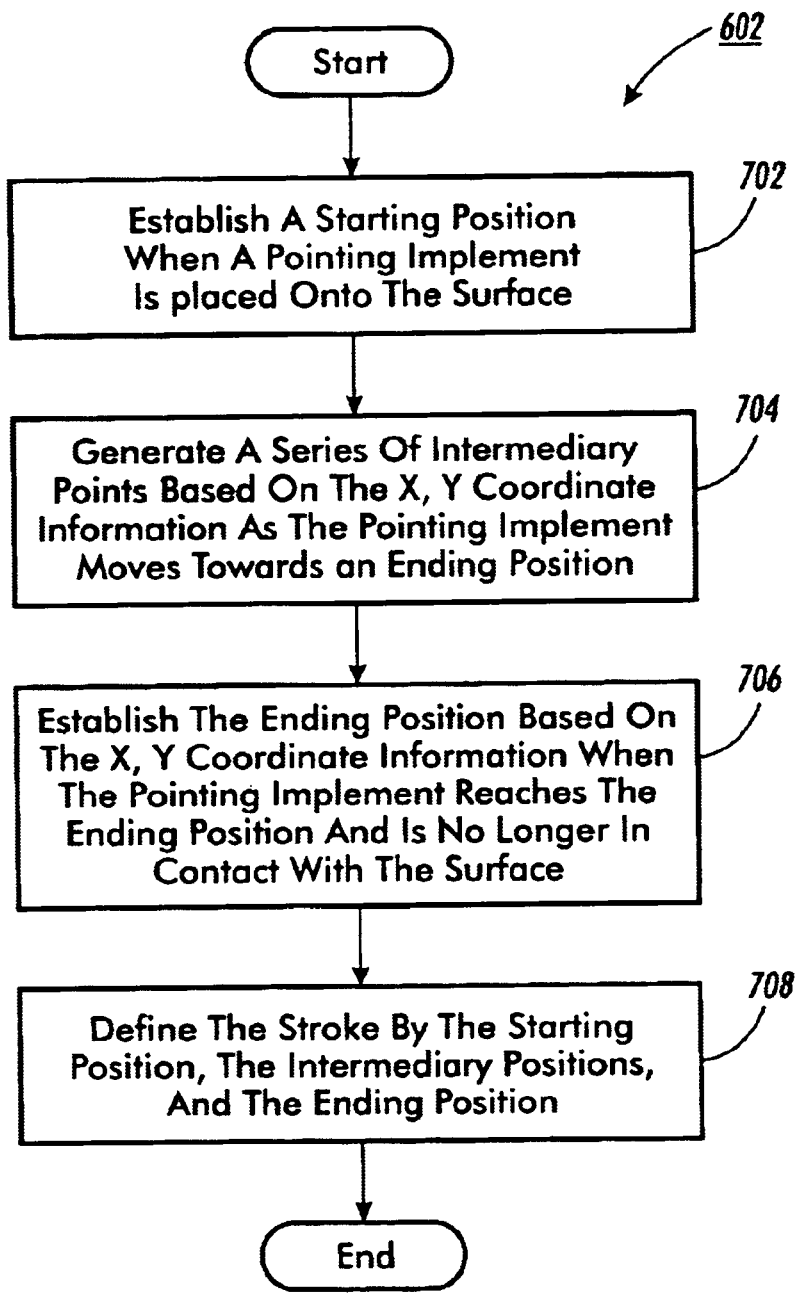
FIG. 7 is a flowchart illustrating the steps used to sense a stroke made on a user interface.

Once the location and direction are determined, processor 110 associates the stroke with a symbol, such as a number or character (step 606). Associating the stroke with a symbol can be based upon any characteristic of the strokes, such as the stroke length, direction of the stroke in relation to buttons on user interface 200, and shape. Processor 110 forwards the symbol to display interface 114 to display the symbol on display device 104. Processor 110 may also forward the symbol to an application, such as an application executing on remote device 105, local device 107, or memory 108 for further processing FIG. 7 is a flowchart diagram illustrating steps used by processor 110 to process the stroke made on a user interface when performing step 602 in FIG. 6. Processor 110 initially begins processing when a user places a pointing device onto the surface of user interface 200. This establishes a starting position for the stroke based on the initial X, Y coordinate information received from processor 110 associated with stroke/button input device 106 (step 702).

Next, processor 110 processes a series of intermediary points received from the stroke/button input device 106 (step 704). The intermediary points are generated as the pointing device moves towards an ending position on the surface of user interface 200. These intermediary points define the direction and location of the stroke on user interface 200. Processor 110 determines the ending position of the stroke when the X, Y coordinate information from stroke/button input device 106 indicates that the pointing device has reached the ending position and is no longer in contact with the surface (step 706). Processor 110 defines the coordinates associated with the complete stroke once the starting position, intermediary positions, and ending positions are established. (step 708).

Figure 8:
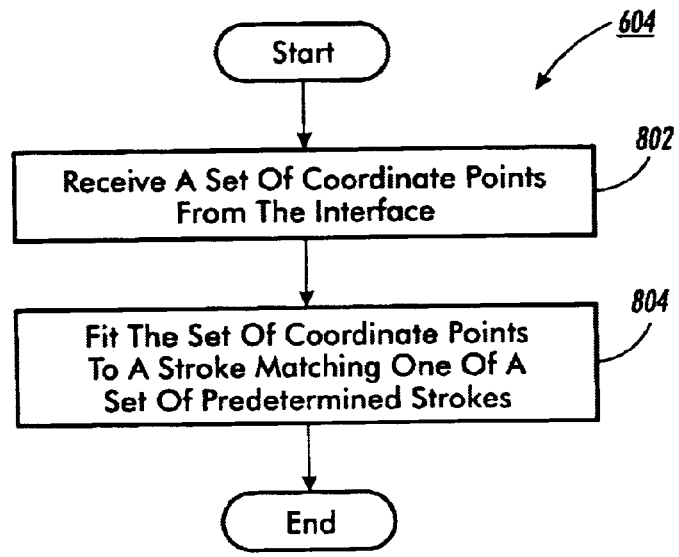
FIG. 8 is a flowchart diagram illustrating the additional steps used to associate the stroke entered onto the user interface with a symbol.

In FIG. 8 is a flowchart illustrating steps used by processor 110 to associate the stroke with a symbol. These steps correspond to step 604 in FIG. 6. Processor 110 receives a set of X,Y coordinate points from stroke/button interface 116 (step 802). These pairs of X and Y coordinate points represent the starting position, intermediary positions, and ending positions of a stroke on user interface 200.

Stroke interpreter process 124 then uses a fitting method to fit these coordinates to one of a set of predetermined strokes typically used with user interface 200 (step 804). In general, fitting methods used by stroke interpreter process 124 compensate for possible errors made when people draw an imperfect stroke on the input device. Accordingly, the specific implementation of the fitting method used by stroke interpreter process 124 varies depending on the processor power of processor 110 and the types of strokes being used in the system. For example, a total least squares fitting method is used by stroke interpreter process 124 to fit a set of coordinate points entered on interface 116 to a straight line. An example of a total least squares fitting methods can be found in "Numerical Methods for Least Squares Problems", by Ake Bjorck, published 1996 by SIAM.

Figure 9:
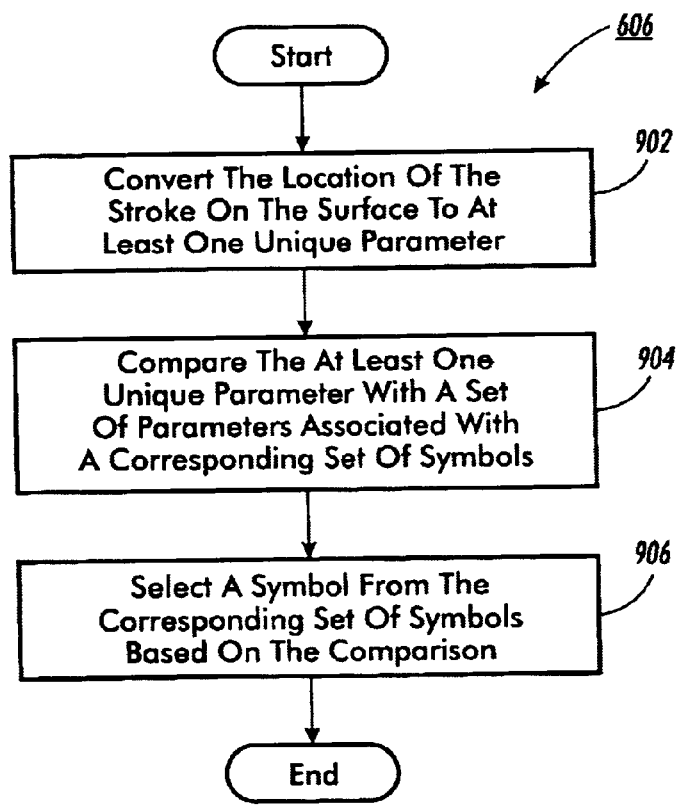
FIG. 9 provides a flowchart diagram showing the steps for associating the stroke identified on the user interface with a symbol.

FIG. 9 is a flowchart diagram illustrating step 606 of FIG. 6 which processor 110 performs to associate the identified stroke with a symbol. This step converts the coordinates associated with a stroke into a symbol an application can operate on and use. Initially processor 110 converts the identified stroke into at least one unique parameter (step 902). If the stroke is linear, for example, as shown in FIG. 3, these unique parameters may include an X or Y intercept, a direction of the stroke, or start and stop information associated with the stroke. For example, the stroke corresponding to the numeric value "2" in FIG. 3 has an X intercept of approximately 2 and moves in a negative direction. Similarly, the stroke corresponding to the numeric value "6" in FIG. 3 has a Y intercept of approximately 3 and moves in a positive direction. Processor 110 compares these unique parameters used to describe the stroke with a predetermined set of parameters and corresponding symbols (step 904). Processor 110 then uses a symbol table to match the unique parameter or parameters with their corresponding symbol. Based on the comparison, processor 110 selects the proper symbol from the symbol table for further processing (step 906).

While specific implementations have been described herein for purposes of illustration, various modifications may be made without departing from the spirit and scope of the invention. For example, methods, apparatus, and systems for selecting symbols consistent with the present invention can be designed as discussed above without using a display device to display the selection or results of the selection as done on a calculator. Such methods, apparatus, and systems could be used to control household appliances, automobile controls, and other devices that don't require display of the symbols.

In addition, methods and systems discussed above can be designed without using a secondary storage device such as a hard disk to store data or information. Instead, this information could be loaded into memory or other temporary storage areas each time the method and system for selecting symbols is used. Further, methods apparatus, and systems for inputting symbols described above can also be used to make a device change modes such as enter a command mode rather than accepting data input. Other modes may be used to make a device interpret and operate on strokes differently. For example, a special stroke can cause a device to enter a data storage mode whereby symbols are stored in the memory of a device and not immediately processed by the device.

Although many of the examples provided were used to enter numeric values, it is also possible that implementations of the present invention can be used to enter alphabetical and alpha-numeric symbols. Further, a combination of buttons and strokes can be used to enter data and not just strokes or buttons. For example, the number zero can be entered by pressing a button on a keyboard while the numbers one through nine are entered using strokes on the user interface.

Those skilled in the art understand that the present invention can be implemented in a wide variety of software platforms and is not limited to any special programming language and development environment. Furthermore, although aspects of the invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A method, executed on a processor, for entering symbols into a user interface, comprising:
   providing a surface that is actuated when contacted, wherein the surface is positioned to cover a plurality of selectable buttons, each depicting a unique symbol;
   receiving information in response to pressure made by a pointing device on at least one of said plurality of selectable buttons;
   outputting the symbol depicted on the button, provided the button is actuated; and
   outputting a second symbol not depicted on any of said plurality of buttons, provided the button is not actuated and a stroke is detected on the surface of the button.

2. The method of claim 1, wherein the step of providing the surface further comprises positioning the surface adjacent to the at least one selectable button.

3. The method of claim 1, wherein the step of receiving information comprises:
   establishing a starting position defining a location where the pointing device is placed onto the surface;
   generating a series of intermediary positions defining locations of the pointing device as the pointing device is moved across the surface toward an ending position;
   establishing the ending position as a location where the pointing device stops moving across the surface; and
   defining the stroke by the starting position, the intermediary positions, and the ending position.

4. The method of claim 3, wherein the step of defining includes determining that the stroke starting position, the intermediary positions, and the ending position define a linear relationship.

5. The method of claim 3, wherein the step of defining includes determining that the stroke starting position, the intermediary positions, and the ending position define a non-linear relationship.

6. The method of claim 3, wherein the step of defining includes determining that the stroke starting position and the ending position define a linear and non-linear relationship.

7. The method of claim 1, wherein outputting a second symbol further comprises fitting the stroke to individual ones of a set of predetermined strokes until a match is found.

8. The method of claim 7 wherein the step of fitting includes performing a complete least squares fitting method.

9. The method of claim 1, wherein outputting a second symbol further comprises:
   relating the stroke to at least one unique parameter;
   comparing the at least one unique parameter with a set of parameters associated with a corresponding set of symbols; and
   selecting a symbol from the corresponding set of symbols based on the comparison.

10. The method of claim 9, wherein the parameters describe a linear relationship.

11. The method of claim 9, wherein the parameters describe a non-linear relationship.

12. An apparatus for entering symbols into a user interface, comprising:
    a processor;
    a surface that is actuated when contacted, wherein the surface is positioned to cover a plurality of selectable buttons, each depicting a unique symbol; and
    a memory containing instructions capable of executing on the processor that: receives information in response to pressure made by a pointing device on at least one of said plurality of selectable buttons; outputs the symbol depicted on the button provided the button is actuated; and outputs a second symbol not depicted on any of said plurality of buttons, provided the button is not actuated and a stroke is detected on the surface of the button.

13. The apparatus of claim 12, wherein the surface is positioned adjacent to the at least one selectable button.

14. The apparatus of claim 12 wherein the instructions that receive the stroke information further comprise instructions that,
    establish a starting position defining a location where the pointing device is placed onto the surface, generate a series of intermediary positions defining locations of the pointing device as the pointing device is moved across the surface toward an ending position, establish the ending position defining a location where the pointing device stops moving across the surface, and define the stroke by the starting position, the intermediary positions, and the ending position.

15. The apparatus of claim 14, wherein the instructions that define the stroke determine that the stroke starting position, the intermediary positions, and the ending position define a linear relationship.

16. The apparatus of claim 14, wherein the instructions that define the stroke determine that the stroke starting position, the intermediary positions, and the ending position define a non-linear relationship.

17. The apparatus of claim 14, wherein the instructions that define the stroke determine that the stroke starting position, the intermediary positions, and the ending position define a combination of a linear and non-linear relationship.

18. The apparatus of claim 12, wherein the instruction to output a second symbol further includes instructions that fit the stroke to one of a set of predetermined strokes until a match is found.

19. The apparatus of claim 18, wherein the instructions that fit the stroke information includes instructions that perform a complete least squares curve fitting method.

20. The apparatus of claim 12, wherein the instruction to output a second symbol further includes instructions that relate the stroke to at least one unique parameter, compare the at least one unique parameter with a set of parameters associated with a corresponding set of symbols, and select a symbol from the corresponding set of symbols based on the comparison.

21. The apparatus of claim 20, wherein the parameters describe a linear relationship.

22. The apparatus of claim 20, wherein the parameters describe a non-linear relationship.

23. An apparatus for entering symbols into a user interface, comprising:

a surface that is actuated when contacted, wherein the surface is positioned to cover a plurality of selectable buttons, each depicting a unique symbol;

means for receiving information in response to pressure made by a pointing device on at least one of said plurality of selectable buttons;

means for outputting the symbol depicted on the button provided the button is actuated; and means for outputting a second symbol not depicted on any of said plurality of buttons, provided the button is not actuated and a stroke is detected on the surface of the button.

* * * * *